US008291347B2

(12) United States Patent
Bocking

(10) Patent No.: US 8,291,347 B2
(45) Date of Patent: *Oct. 16, 2012

(54) METHOD AND SYSTEM FOR MANAGING UNREAD ELECTRONIC MESSAGES

(75) Inventor: Andrew D. Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 578 days.

This patent is subject to a terminal disclaimer.

(21) Appl. No.: 12/423,427

(22) Filed: Apr. 14, 2009

(65) Prior Publication Data

US 2009/0210823 A1 Aug. 20, 2009

Related U.S. Application Data

(63) Continuation of application No. 10/785,340, filed on Feb. 24, 2004.

(51) Int. Cl.
G06F 3/048 (2006.01)

(52) U.S. Cl. ........ 715/859; 715/739; 715/752; 715/753; 715/765; 715/837; 715/854; 715/856

(58) Field of Classification Search .................. 715/752, 715/776, 739, 765, 839, 854, 855
See application file for complete search history.

(56) References Cited

U.S. PATENT DOCUMENTS

| | | | | |
|---|---|---|---|---|
| 5,003,577 A | * | 3/1991 | Ertz et al. | 379/88.13 |
| 5,426,424 A | * | 6/1995 | Vanden Heuvel et al. | 340/7.52 |
| 5,504,897 A | * | 4/1996 | Gans et al. | 1/1 |
| 5,539,530 A | * | 7/1996 | Reifman et al. | 358/402 |
| 5,579,472 A | * | 11/1996 | Keyworth et al. | 715/751 |
| 5,617,539 A | * | 4/1997 | Ludwig et al. | 709/205 |
| 5,687,216 A | * | 11/1997 | Svensson | 455/412.2 |
| 5,758,079 A | * | 5/1998 | Ludwig et al. | 709/204 |
| 5,764,901 A | * | 6/1998 | Skarbo et al. | 709/204 |
| 5,794,039 A | * | 8/1998 | Guck | 1/1 |
| 5,835,084 A | * | 11/1998 | Bailey et al. | 715/783 |
| 5,835,762 A | * | 11/1998 | Gans et al. | 718/100 |
| 5,867,654 A | * | 2/1999 | Ludwig et al. | 709/204 |
| 5,915,004 A | * | 6/1999 | Pabbati et al. | 379/100.08 |
| 5,936,548 A | * | 8/1999 | Takatsuka | 340/7.52 |
| 5,966,351 A | | 10/1999 | Carleton et al. | |

(Continued)

FOREIGN PATENT DOCUMENTS

CA 2 503 528 5/2004

(Continued)

OTHER PUBLICATIONS

P2000-295648A-non-English, Oct. 20, 2000.*

(Continued)

Primary Examiner — Boris Pesin
Assistant Examiner — John Heffington
(74) Attorney, Agent, or Firm — Finnegan, Henderson, Farabow, Garrett & Dunner, LLP

(57) ABSTRACT

The presence of new unread electronic messages received, that is, messages received since unread messages were last reviewed, is provided by indicia presented to the user. These indicia can take various forms, such as by bolding, flashing, changing the size or color of a count of unread messages, and/or the unread message icon. Alternatively, a separate indication, such as a second count representing the number of new unread electronic messages received, or some other symbol, such as an explanation point, can be displayed.

11 Claims, 4 Drawing Sheets

U.S. PATENT DOCUMENTS

| | | | | |
|---|---|---|---|---|
| 6,037,935 A * | 3/2000 | Bates et al. | | 715/760 |
| 6,065,012 A * | 5/2000 | Balsara et al. | | 1/1 |
| 6,078,820 A * | 6/2000 | Wells et al. | | 455/466 |
| 6,092,101 A * | 7/2000 | Birrell et al. | | 709/206 |
| 6,125,281 A * | 9/2000 | Wells et al. | | 455/466 |
| 6,157,814 A | 12/2000 | Hymel et al. | | |
| 6,192,396 B1 * | 2/2001 | Kohler | | 709/206 |
| 6,212,547 B1 * | 4/2001 | Ludwig et al. | | 709/204 |
| 6,216,127 B1 * | 4/2001 | Gans et al. | | 1/1 |
| 6,337,699 B1 | 1/2002 | Nielsen | | |
| 6,396,509 B1 | 5/2002 | Cheng | | |
| 6,396,513 B1 | 5/2002 | Helfman et al. | | |
| 6,429,772 B1 * | 8/2002 | Lizzi | | 340/7.55 |
| 6,466,654 B1 * | 10/2002 | Cooper et al. | | 379/88.01 |
| 6,489,950 B1 | 12/2002 | Griffin et al. | | |
| 6,557,036 B1 * | 4/2003 | Kavacheri et al. | | 709/224 |
| 6,628,194 B1 | 9/2003 | Hellebust et al. | | |
| 6,724,403 B1 * | 4/2004 | Santoro et al. | | 715/765 |
| 6,731,308 B1 * | 5/2004 | Tang et al. | | 715/751 |
| 6,741,268 B1 * | 5/2004 | Hayakawa | | 715/777 |
| 6,757,372 B1 * | 6/2004 | Dunlap et al. | | 379/142.17 |
| 6,778,069 B1 * | 8/2004 | Katagiri | | 340/7.55 |
| 6,792,085 B1 * | 9/2004 | Rigaldies et al. | | 379/88.13 |
| 6,892,083 B2 * | 5/2005 | Shostak | | 455/575.6 |
| 6,925,605 B2 * | 8/2005 | Bates et al. | | 715/745 |
| 6,965,917 B1 | 11/2005 | Aloni et al. | | |
| 6,981,223 B2 * | 12/2005 | Becker et al. | | 715/753 |
| 7,028,264 B2 * | 4/2006 | Santoro et al. | | 715/765 |
| 7,047,030 B2 * | 5/2006 | Forsyth | | 455/518 |
| 7,058,683 B1 * | 6/2006 | Belissent et al. | | 709/206 |
| 7,061,470 B1 * | 6/2006 | Sharp | | 345/160 |
| 7,076,057 B1 * | 7/2006 | Sharp | | 379/433.06 |
| 7,085,812 B1 | 8/2006 | Sherwood | | |
| 7,120,474 B1 * | 10/2006 | Sharp | | 455/575.1 |
| 7,151,923 B2 * | 12/2006 | Boland et al. | | 455/412.2 |
| 7,181,701 B2 * | 2/2007 | Howard et al. | | 715/854 |
| 7,185,054 B1 * | 2/2007 | Ludwig et al. | | 709/204 |
| 7,212,814 B2 | 5/2007 | Wilson et al. | | |
| 7,213,206 B2 * | 5/2007 | Fogg | | 715/706 |
| 7,213,210 B2 | 5/2007 | Reysa | | |
| 7,215,975 B1 * | 5/2007 | Sharp | | 455/550.1 |
| 7,234,112 B1 * | 6/2007 | Brown et al. | | 715/713 |
| 7,248,881 B2 * | 7/2007 | Shostak | | 455/456.1 |
| 7,254,410 B2 * | 8/2007 | Park | | 455/466 |
| 7,257,415 B2 * | 8/2007 | Shostak | | 455/456.1 |
| 7,281,201 B2 * | 10/2007 | Kumar et al. | | 715/255 |
| 7,281,215 B1 * | 10/2007 | Canfield et al. | | 715/752 |
| 7,310,541 B2 * | 12/2007 | Shostak | | 455/575.6 |
| 7,313,389 B1 * | 12/2007 | Sharp et al. | | 455/418 |
| 7,319,743 B1 * | 1/2008 | Dunlap | | 379/93.01 |
| 7,376,907 B2 * | 5/2008 | Santoro et al. | | 715/765 |
| 7,398,296 B2 * | 7/2008 | Ludwig et al. | | 709/204 |
| 7,412,482 B2 * | 8/2008 | Ludwig et al. | | 709/204 |
| 7,415,100 B2 * | 8/2008 | Cooper et al. | | 379/88.01 |
| 7,421,470 B2 * | 9/2008 | Ludwig et al. | | 709/204 |
| 7,433,921 B2 * | 10/2008 | Ludwig et al. | | 709/204 |
| 7,437,179 B1 * | 10/2008 | Sharp | | 455/550.1 |
| 7,437,411 B2 * | 10/2008 | Ludwig et al. | | 709/204 |
| 7,437,412 B2 * | 10/2008 | Ludwig et al. | | 709/204 |
| 7,439,872 B2 * | 10/2008 | Hiltunen | | 340/691.1 |
| 7,441,001 B2 * | 10/2008 | Ludwig et al. | | 709/204 |
| 7,444,373 B2 * | 10/2008 | Ludwig et al. | | 709/204 |
| 7,454,716 B2 | 11/2008 | Venolia | | |
| 7,460,858 B2 * | 12/2008 | Boland et al. | | 455/412.2 |
| 7,487,210 B2 * | 2/2009 | Ludwig et al. | | 709/204 |
| 7,542,772 B2 * | 6/2009 | Jun | | 455/466 |
| 7,605,801 B1 * | 10/2009 | Sharp | | 345/161 |
| 7,634,528 B2 * | 12/2009 | Horvitz et al. | | 709/200 |
| 7,669,140 B2 * | 2/2010 | Matthews et al. | | 715/779 |
| 7,707,244 B2 * | 4/2010 | Malik et al. | | 709/203 |
| 7,739,407 B1 * | 6/2010 | Pakkala | | 709/246 |
| 7,908,320 B2 * | 3/2011 | Ludwig et al. | | 709/204 |
| 7,920,678 B2 * | 4/2011 | Cooper et al. | | 379/8 |
| 7,941,491 B2 * | 5/2011 | Sood | | 709/206 |
| 7,987,431 B2 * | 7/2011 | Santoro et al. | | 715/765 |
| 8,000,453 B2 * | 8/2011 | Cooper et al. | | 379/88.03 |
| 8,019,834 B2 * | 9/2011 | Horvitz et al. | | 709/217 |
| 8,121,649 B2 * | 2/2012 | Shostak | | 455/563 |
| 2002/0019852 A1 * | 2/2002 | Bahar | | 709/206 |
| 2002/0076004 A1 * | 6/2002 | Brockenbrough et al. | | 379/67.1 |
| 2002/0130904 A1 * | 9/2002 | Becker et al. | | 345/753 |
| 2002/0160817 A1 * | 10/2002 | Salmimaa et al. | | 455/566 |
| 2002/0170040 A1 * | 11/2002 | Idan | | 717/141 |
| 2002/0191754 A1 * | 12/2002 | Liu et al. | | 379/88.01 |
| 2002/0193128 A1 * | 12/2002 | Park | | 455/466 |
| 2003/0014490 A1 * | 1/2003 | Bates et al. | | 709/206 |
| 2003/0020671 A1 * | 1/2003 | Santoro et al. | | 345/1.3 |
| 2003/0064707 A1 | 4/2003 | Yoneyama | | |
| 2003/0073434 A1 * | 4/2003 | Shostak | | 455/426 |
| 2003/0120957 A1 * | 6/2003 | Pathiyal | | 713/202 |
| 2004/0056893 A1 * | 3/2004 | Canfield et al. | | 345/753 |
| 2004/0073605 A1 * | 4/2004 | Conley, Jr. | | 709/203 |
| 2004/0127241 A1 * | 7/2004 | Shostak | | 455/500 |
| 2004/0130580 A1 * | 7/2004 | Howard et al. | | 345/854 |
| 2004/0137882 A1 * | 7/2004 | Forsyth | | 455/414.1 |
| 2004/0155908 A1 * | 8/2004 | Wagner | | 345/854 |
| 2004/0155909 A1 | 8/2004 | Wagner | | |
| 2004/0162773 A1 * | 8/2004 | Del Rey et al. | | 705/36 |
| 2004/0176905 A1 * | 9/2004 | Sanqunetti et al. | | 701/200 |
| 2004/0199663 A1 * | 10/2004 | Horvitz et al. | | 709/238 |
| 2004/0259598 A1 * | 12/2004 | Wagner et al. | | 455/566 |
| 2004/0266400 A1 * | 12/2004 | Boland et al. | | 455/412.1 |
| 2004/0266403 A1 * | 12/2004 | Boland et al. | | 455/412.2 |
| 2005/0053013 A1 * | 3/2005 | Traylor et al. | | 370/254 |
| 2005/0076110 A1 * | 4/2005 | Mathew et al. | | 709/223 |
| 2005/0080880 A1 * | 4/2005 | von Tetzchner et al. | | 709/219 |
| 2005/0114458 A1 | 5/2005 | Gottlieb | | |
| 2005/0114753 A1 * | 5/2005 | Kumar et al. | | 715/500.1 |
| 2005/0114781 A1 * | 5/2005 | Brownholtz et al. | | 715/733 |
| 2005/0138552 A1 | 6/2005 | Venolia | | |
| 2005/0170863 A1 * | 8/2005 | Shostak | | 455/556.1 |
| 2005/0193345 A1 * | 9/2005 | Klassen et al. | | 715/751 |
| 2005/0240983 A1 | 10/2005 | Peters | | |
| 2005/0248437 A1 * | 11/2005 | Hellebust et al. | | 340/7.51 |
| 2005/0283734 A1 * | 12/2005 | Santoro et al. | | 715/765 |
| 2006/0020677 A1 | 1/2006 | Von Koch | | |
| 2006/0084450 A1 * | 4/2006 | Dam Nielsen et al. | | 455/466 |
| 2006/0106703 A1 * | 5/2006 | Del Rey et al. | | 705/35 |
| 2006/0189337 A1 * | 8/2006 | Farrill et al. | | 455/518 |
| 2006/0200455 A1 * | 9/2006 | Wilson | | 707/4 |
| 2007/0032269 A1 * | 2/2007 | Shostak | | 455/563 |
| 2007/0107014 A1 * | 5/2007 | Howard et al. | | 725/44 |
| 2007/0161400 A1 * | 7/2007 | Sharp et al. | | 455/550.1 |
| 2008/0057977 A1 * | 3/2008 | Shostak | | 455/456.1 |
| 2008/0140415 A1 * | 6/2008 | Shostak | | 704/270.1 |
| 2008/0140416 A1 * | 6/2008 | Shostak | | 704/270.1 |
| 2008/0201306 A1 * | 8/2008 | Cooper et al. | | 707/3 |
| 2009/0018834 A1 * | 1/2009 | Cooper et al. | | 704/257 |
| 2009/0018835 A1 * | 1/2009 | Cooper et al. | | 704/257 |
| 2009/0018839 A1 * | 1/2009 | Cooper et al. | | 704/260 |
| 2009/0132942 A1 * | 5/2009 | Santoro et al. | | 715/765 |
| 2009/0299934 A1 * | 12/2009 | Horvitz et al. | | 706/45 |
| 2010/0057875 A1 * | 3/2010 | Bychkov et al. | | 709/206 |
| 2010/0287483 A1 * | 11/2010 | Smith et al. | | 715/753 |

FOREIGN PATENT DOCUMENTS

| | | |
|---|---|---|
| EP | 0 961 447 | 5/1998 |
| JP | 2000295648 | 10/2000 |
| WO | 99/43171 A1 | 8/1999 |
| WO | WO 02/19082 | 3/2002 |
| WO | WO 2005/115035 | 12/2005 |

OTHER PUBLICATIONS

JP-2000295-A, Abstract, Oct. 20, 2000.*
Canadian Examiner Action, Apr. 26, 2012.*
12423427_20120504_Ask-Search-qsrc_1_o_0_I_dir_q_message_board_new_mes.pdf.*
12423427_20120504_Ask-Search-qsrc_1_o_0_I_dir_q_new_unread_message.pdf.*
12423427_20120504_Ask-Search-qsrc_1_o_0_I_dir_q_new_unread_message_fo.pdf.*
12423427_20120504_Ask-Search-qsrc_1_o_0_I_dir_q_message_board_new_unr.pdf.*
Gini Courter, et al., "Mastering Microsoft Office 2003 for Business Professionals," Published by John Wiley and Sons, Feb. 6, 2004, ISBN 0782142281, 695 pages; http://books.google.com/books?id=VHPfK9CH8-sC; 18 pp.

Office Action in copending U.S. Appl. No. 10/785,340 dated Mar. 20, 2007, 17 pp.

Office Action in copending U.S. Appl. No. 10/785,340 dated Aug. 23, 2007, 26 pp.

Office Action in copending U.S. Appl. No. 10/785,340 dated Oct. 31, 2007, 3 pp.

Office Action in copending U.S. Appl. No. 10/785,340 dated Feb. 20, 2008, 30 pp.

Office Action in copending U.S. Appl. No. 10/785,340 dated Aug. 20, 2008, 32 pp.

Office Action in copending U.S. Appl. No. 10/785,340 dated Apr. 1, 2009, 22 pp.

Office Action in copending U.S. Appl. No. 10/785,340 dated Oct. 28, 2009, 27 pp.

Office Action in copending U.S. Appl. No. 10/785,340 dated Apr. 13, 2010, 3 pp.

Office Action in copending U.S. Appl. No. 11/320,980 dated Feb. 3, 2011, 3 pp.

Office Action in copending U.S. Appl. No. 11/320,980 dated Oct. 4, 2010, 14 pp.

Office Action in copending U.S. Appl. No. 11/320,980 dated Dec. 28, 2009, 15 pp.

Office Action in copending U.S. Appl. No. 11/320,980 dated Jun. 16, 2009, 14 pp.

Office Action in copending U.S. Appl. No. 11/320,980 dated Mar. 17, 2009, 3 pp.

Office Action in copending U.S. Appl. No. 11/320,980, dated Dec. 24, 2008, 15 pp.

Office Action in copending U.S. Appl. No. 11/320,980 dated Sep. 18, 2008, 3 pp.

Office Action in copending U.S. Appl. No. 11/320,980 dated Jul. 10, 2008, 14 pp.

Office Action in copending U.S. Appl. No. 11/320,980 dated Jan. 8, 2008, 13 pp.

Office Action in Canadian Patent Application 2,498,082, dated Mar. 23, 2010, counterpart of U.S. Appl. No. 10/785,340, 4 pp.

Office Action in Canadian Patent Application 2,572,423, dated Mar. 9, 2010, counterpart of U.S. Appl. No. 11/320,980, 2 pp.

Office Action in Canadian Patent Application 2,572,423, dated Jun. 11, 2009, counterpart of U.S. Appl. No. 11/320,980, 3 pp.

Microsoft Corporation, Microsoft Outlook 2000, 1999, Microsoft Corporation, Outlook main page.

Robert Cowart, Mastering Windows 95, 1995, Sybex, p. 571.

Cyrusoft International, Inc., "Getting Started Guide—Mulberry IMAP Internet Mail Client Version 2.1", Internet Document, 2001, pp. 1-36, XP002278985.

GMX, "GMX Handbuch," May 2003, Metys Verlag GmbH, Germany, XP002279699.

Office Action in Canadian Patent Application No. 2,498,082, counterpart of U.S. Appl. No. 10/785,340, dated Apr. 20, 2011, 4 pp.

Office Action in European Patent Application No. 05113104.3, counterpart of U.S. Appl. No. 11/320,980, dated Apr. 5, 2011, 7 pp.

Office Action in Canadian Patent Application No. 2,572,423, counterpart of U.S. Appl. No. 11/320,980, dated Aug. 5, 2011, 3 pp.

Office Action issued by the Canadian Intellectual Property Office dated Apr. 23, 2012 for corresponding Canadian Patent Application No. 2,498,082, 4 pages.

Office Action in copending U.S. Appl. No. 10/785,340 dated Jan. 12, 2012, 61 pages.

Office Action in copending U.S. Appl. No. 11/320,980 dated May 11, 2011, 15 pages.

Office Action in corresponding U.S. Appl. No. 10/785,40 dated Jul. 1, 2011, 52 pages.

* cited by examiner

METHOD AND SYSTEM FOR MANAGING UNREAD ELECTRONIC MESSAGES

CROSS-REFERENCE TO RELATED APPLICATION

The instant application is a continuation of U.S. patent application Ser. No. 10/785,340, filed Feb. 24, 2004, entitled "Method and System for Managing Unread Electronic Messages", the disclosure of which is incorporated herein.

BACKGROUND OF THE INVENTION

1. Field of the Invention

Aspects of this invention relate to the presentation of information providing assistance to a recipient in reviewing and processing electronic messages received. More particularly, they relate to a method and apparatus for managing unread electronic messages received.

2. Background Information

Electronic messaging has become a ubiquitous means of communication for both business and personal use. The volume of electronic messages received can be overwhelming. Devices that process electronic messages typically maintain a message list identifying electronic messages received for reading and processing by the recipient. Such processing can include replying to, deleting and filing the messages. It is common to provide a count of unread messages.

Recipients of electronic messages can be classified as either: (a) cleaners—those who file/delete electronic messages to maintain a clean message list that can then essentially be used as a task list; and (b) collectors—those who rarely file or delete electronic messages and leave numerous messages unread on an ongoing basis. Anecdotally, there is roughly a 50/50 split between cleaners and collectors within the user base of handheld electronic devices.

SUMMARY OF THE INVENTION

In accordance with an aspect of the invention, an indication is provided of the presence of new unread electronic messages received since the message list was last viewed (and potentially an e-mail message opened/viewed). This indication can merely signal that there are new unread messages or it can be quantitative and indicate the number of new unread messages received.

More particularly, one aspect of the invention is directed to a method of managing unread electronic messages received that comprises the steps of: providing an indication of the presence of unread electronic messages received; enabling scanning of the unread electronic messages received without reading; and generating an indication that new electronic messages have been received since the unread electronic messages received were last scanned. The presence of unread electronic messages can be provided through a visual display with the indication of new electronic messages received generated by altering the visual display. The visual display can be altered in various ways to indicate the presence of new unread electronic messages received. For instance, where the visual display provides a visual indication of the count of unread electronic messages received, the display can be altered by, for example, bolding, flashing, changing the size or changing the color of the count. Where an icon representing the presence of unread electronic messages is used in addition to the count of unread messages, the display can be altered by altering at least one of the icon and the count. Furthermore, the display can be altered to indicate the presence of new unread electronic messages received by adding an indicia, which can be a second count representing the number of new unread electronic messages received.

Another aspect of the invention is directed to a system for managing electronic messages received comprising: a display, a message list of electronic messages received with identification of those that are unread; an input means for selectively displaying the message list on the display for scanning for unread messages received; and indicator means on the display indicating the presence of new unread electronic messages received since the message list was last displayed. The indicating means can include means providing on the display a count of the unread electronic messages received in addition to the indication of the presence of new unread electronic messages received. The indicating means providing an indication of new unread electronic messages received can be an alteration to the count of the unread electronic messages received such as by at least one of bolding the count, flashing the count, changing the size of the count and changing the color of the count. Alternatively, the indicator means providing the indication of the presence of a new unread electronic message received can provide additional indicia on the display such as a second count that is a count of the new unread electronic messages received, or another symbol. Also, alternatively the indicator means can further comprise a message icon on the display adjacent the count of unread electronic messages received and the indication of the presence of new unread electronic messages received can be an alteration to the message icon, such as for example, by bolding, flashing, changing the size and/or changing the color of the icon.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
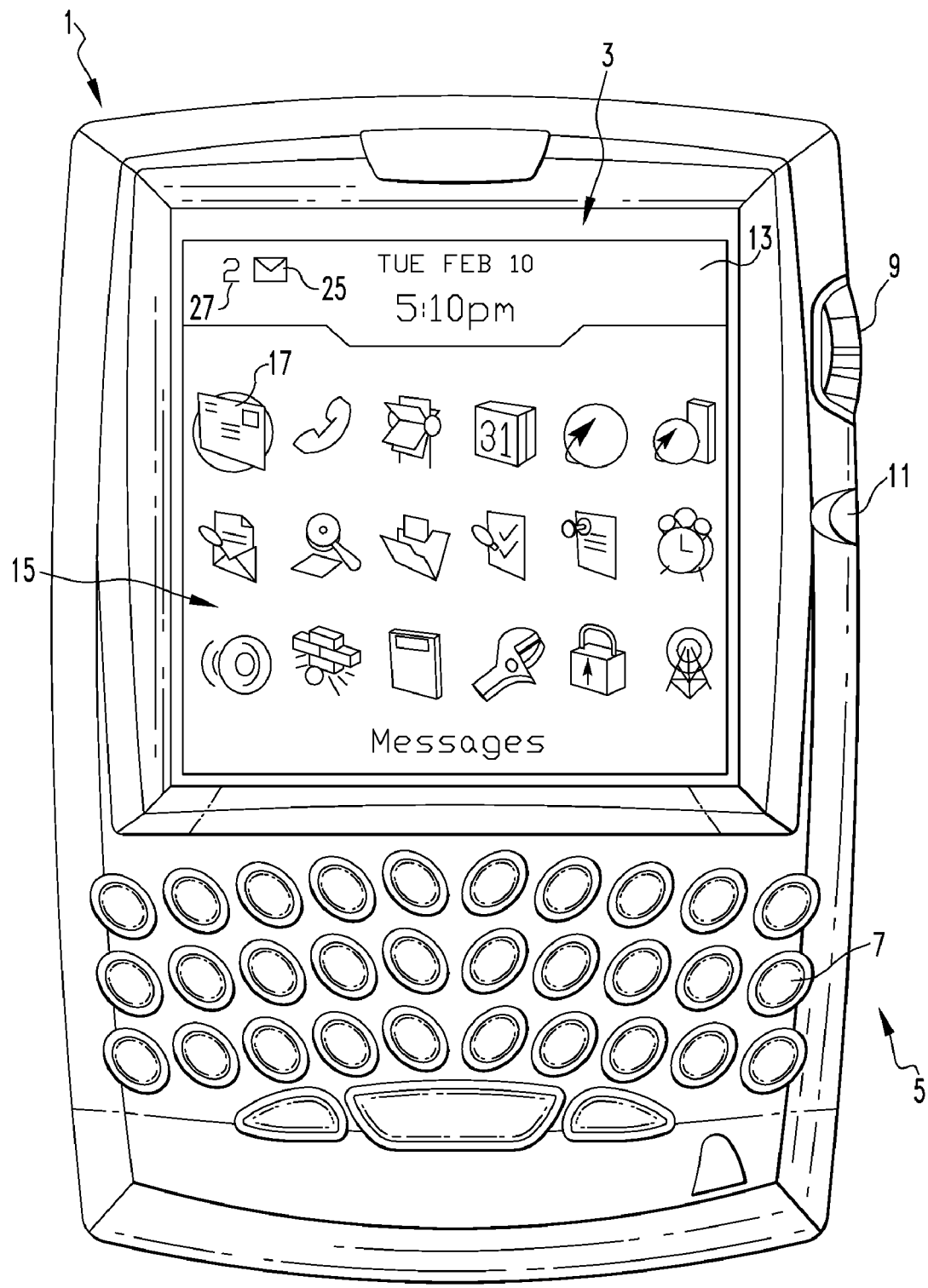
FIG. 1 is a front view of a handheld electronic device incorporating the invention and displaying the home screen indicating the presence of unread electronic messages received, but no new unread electronic messages received.

Aspects of the invention will be described as applied to a handheld electronic device. However, they are applicable to other devices that receive electronic messages such as workstations, desktop computers, laptop computers, cell phones and the like. In the exemplary embodiments of the invention, the electronic messages are text messages that are delivered over the Internet, an intranet or other communications channels, and can include wireless transmissions. Referring to FIG. 1, the handheld electronic device 1 has a display 3 and an input device 5 that includes a keyboard 7, a trackwheel 9 and an escape button 11. The display 3 can present a number of screens with FIG. 1 illustrating the home screen 13. The home screen 13 displays a number of icons 15 which can be highlighted by the trackwheel 9 to select one of a number of functions that can be performed by the device, as is known. An icon 17 can be selected to bring up on the display a message list 19 illustrated in FIG. 2, which presents summary information on all of the electronic messages received that have not yet been processed. This includes messages that have been read and those that are unread. Messages are read by scrolling through the message list with the trackwheel 9 and then pressing inward on the trackwheel to open the selected message. Messages that have been read are identified by the open envelope icon 21 at the left side of the message list 19. Those that are unread are identified by the closed envelope icon 23.

Figure 2:
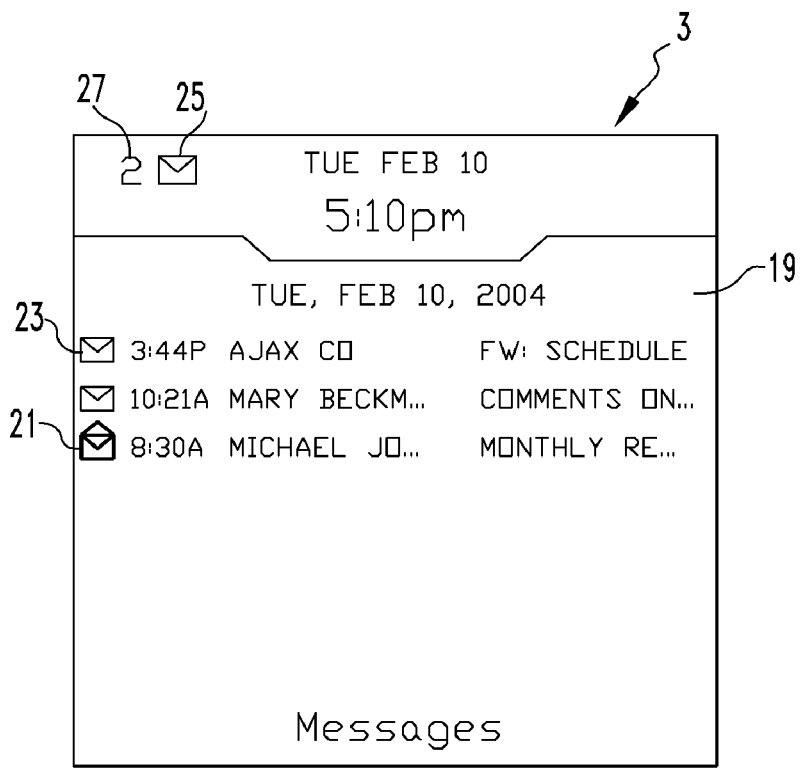
FIG. 2 is a message list displayed on the handheld electronic device of FIG. 1.

When there are unread electronic messages, a mail icon 25 is displayed in the top left corner of the message list screen 19 with an indicia of the number of unread electronic messages received in the form of a count 27 of unread messages presented to the left of the mail icon 25, as is common practice. In the example of FIG. 2, there are two unread electronic messages. Returning to FIG. 1, the mail icon 25 and unread message count 27 are also displayed in the upper left corner of the home screen 13 when there are unread electronic messages present.

Figure 3:
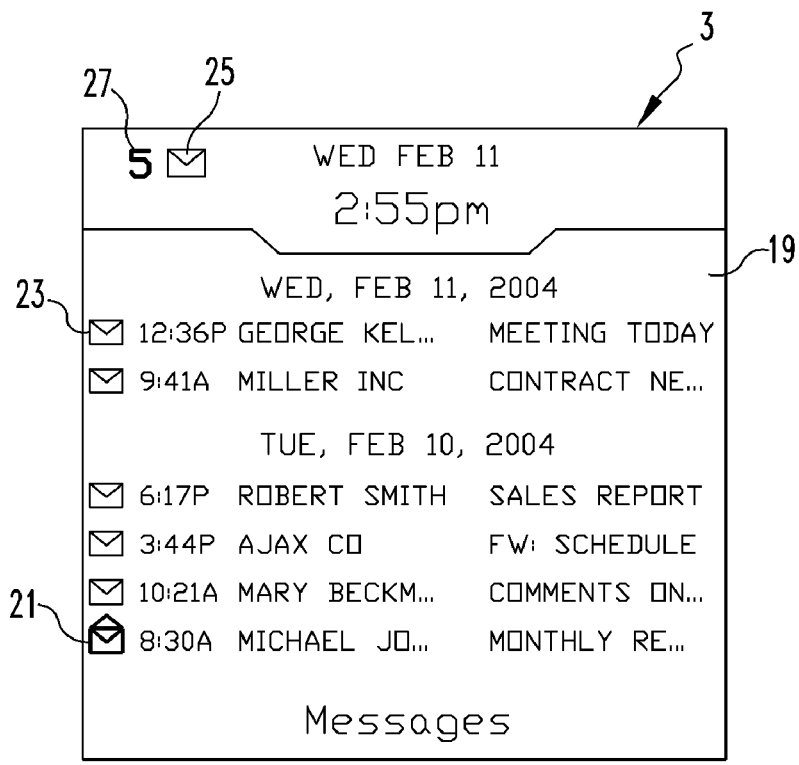
FIG. 3 is a message list similar to FIG. 2 illustrating the display of an indication of the presence of new unread electronic messages received in accordance with one embodiment of the invention.

As was mentioned, there are a significant number of recipients of electronic messages who do not regularly clean out their messages received because of the sheer volume of messages and/or the lack of time or inclination. Aspects of the invention help these people to manage their electronic messages received by providing an indication that new electronic messages have been received since the user last scanned the message list. FIG. 3 extends the example of FIG. 2 by illustrating the message list 19 at a later time when three new unread messages have been received since the list was last scanned to join the two old messages that remain unread. In accordance with this aspect of the invention, an indication of the presence of unread electronic messages received is provided. This is implemented, for example, by the mail icon 25 accompanied by the unread message count 27 presented on the home screen 13, as is common. Scanning of the unread electronic messages received without reading of the messages is enabled by calling up the message list 19 through selection of the read mail icon 17 from the home screen 13 shown in FIG. 1. An indication that new unread electronic messages have been received since the message list was last scanned is also provided. This indication can take many forms. In a first embodiment of the invention illustrated in FIG. 3, the unread message count 27 is bolded to provide this indication. The same bolding of the unread message count 27 is effected on the home screen 13 (not shown). The user may then call up from the home screen and scan the message list 19. As the messages are arranged in the order received, the user need only scan from the top of the message list to observe the new unread electronic messages received.

Figure 4:
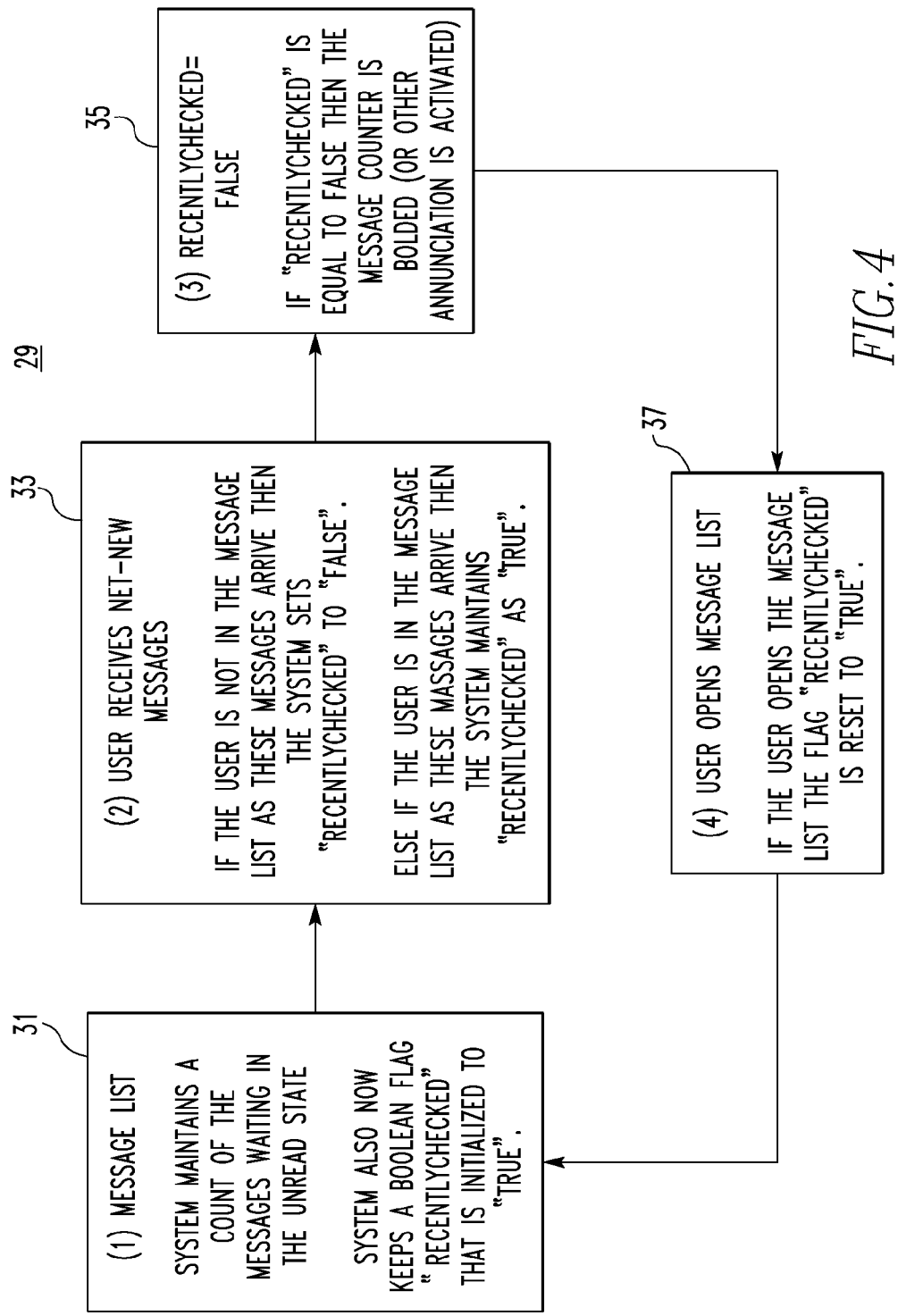
FIG. 4 is a flow chart illustrating implementation of the embodiment of FIG. 3.

FIG. 4 is a flow chart 29 illustrating the process. As indicated at 31, the system maintains a count of messages waiting in the unread state. The system also keeps a "recently checked" flag that is initialized to "true." When the user receives net-new messages at 33 and the device is not displaying the message list as these messages arrive, the "recently checked" flag is set to "false." If the user is viewing the message list as these new messages arrive, the system maintains the "recently checked" flag in the "true" state. When the "recently checked" flag is set to "false," the unread message count icon 27 is bolded at 35. Alternatively, as discussed below, other annunciations can be activated to provide the indication of the presence of new unread electronic messages received. When the user opens the message list 19 as indicated at 37, the "recently checked" flag is reset to "true" until additional new unread electronic messages are received. Alternatively, or in addition to bolding the unread message count 27, the mail icon 25 can be bolded.

Figure 5:
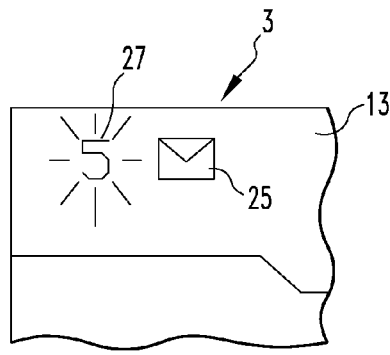
FIG. 5 is similar to FIG. 3 but illustrating a display of an indication of the presence of new unread electronic messages received in accordance with a second embodiment of the invention.

FIG. 5 illustrates a second embodiment of the invention in which the unread message count 27 is flashed to provide the indication of new unread electronic messages received. As in the case of bolding, alternatively or additionally, the mail icon 25 can be flashed.

Figure 6:
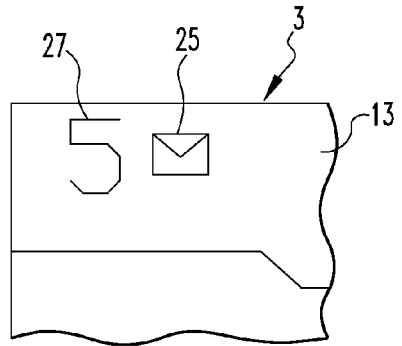
FIG. 6 is similar to FIG. 3 but illustrating a display of an indication of the presence of new unread electronic messages received in accordance with a third embodiment of the invention.

A third embodiment of the invention is illustrated in FIG. 6 where the size of the unread message count (and/or the size of the mail icon 25) can be increased to provide the indication of new unread messages received.

Figure 7:
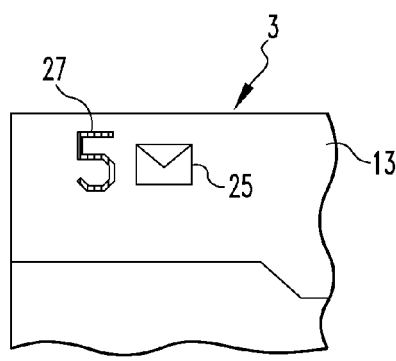
FIG. 7 is similar to FIG. 3 but illustrating a display of an indication of the presence of new unread electronic messages received in accordance with a fourth embodiment of the invention.

FIG. 7 illustrates a fourth embodiment of the invention in which the color of the unread message count 27 (and/or the mail icon 25) is changed to provide the indication of new unread electronic messages received. Where the device has a black and white display, the color change can be implemented by a negative image of the count (e.g., white on black instead of black on white).

Figure 8:
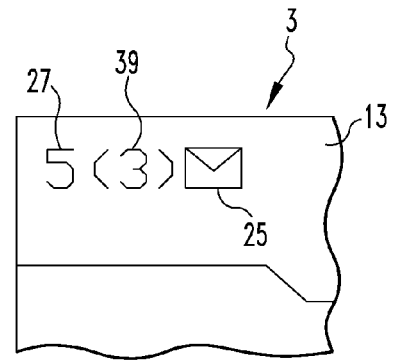
FIG. 8 is similar to FIG. 3 but illustrating a display of an indication of the presence of new unread electronic messages received in accordance with a fifth embodiment of the invention.
Figure 9:
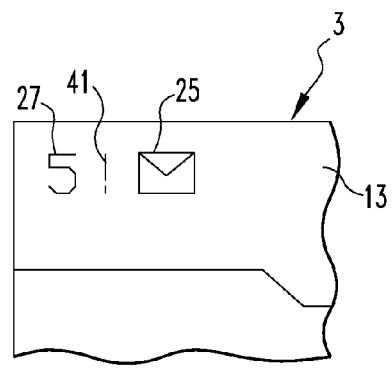
FIG. 9 is similar to FIG. 3 but illustrating a display of an indication of the presence of new unread electronic messages received in accordance with a sixth embodiment of the invention.

A fifth embodiment of the invention is illustrated in FIG. 8 where a second count 39, which is a count of the new unread messages received, is displayed on the home screen 13 in addition to the unread message count 27. This second count 39 can be distinguished, such as by placing it in parenthesis as shown in FIG. 8, making it a different color from the count 27, or by otherwise differentiating the two counts.

In yet another, sixth, embodiment of the invention, an additional indicia 41 is provided to indicate the presence of new unread electronic messages. In the example an explanation point is used. Clearly, other symbols could be used. In fact, it will be apparent at this point that other indicia, within the imagination of those skilled in the art, could be provided to indicate the presence of new unread electronic messages.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of managing unopened electronic messages comprising:

receiving at least one electronic message;

providing a first non-numerical indicator reflecting a presence of the at least one received electronic message being unopened, and that the at least one received electronic message has not yet been displayed in a message listing;

detecting display of a message listing including the at least one received electronic message without displaying content from a body of the at least one received electronic message, the at least one received electronic message remaining in an unopened state; and generating a second indicator reflecting a presence of the at least one received electronic message being in the unopened state but having been displayed in the message listing, the first non-numerical indicator being different from the second indicator in that the first non-numerical indicator comprises an annunciation providing an indication that the at least one received electronic message has not yet been displayed in the message listing.

2. The method of claim 1, wherein the annunciation comprises at least one selected from the group comprising:
flashing, bolding, changing the size, and changing the color of the first non-numerical indicator.

3. The method of claim 1, wherein the first non-numerical indicator comprises a visual display indicating the presence of the at least one electronic message remaining in an unopened state and not yet having been displayed in the message listing.

4. The method of claim 1, wherein the first non-numerical indicator comprises an icon indicating the presence of the at least one electronic message remaining in an unopened state and not yet having been displayed in the message listing.

5. The method of claim 1, wherein the second indicator comprises a visual indication of a count of unread electronic messages.

6. A handheld electronic device comprising: an input device and a display, the handheld electronic device adapted to:
receive at least one electronic message;
provide a first non-numerical indicator on the display reflecting the presence of the at least one received electronic message being unopened, and that the at least one received electronic message has not yet been displayed in a message listing;
detect an input from the input device to display a message listing that does not display content from a body of unopened electronic messages, such that the at least one received electronic message remains in an unopened state; and
generate a second indicator on the display, the second indicator reflecting the presence of the at least one received electronic message being in the unopened state but having been displayed in the message listing, the first non-numerical indicator being different from the second indicator in that the first non-numerical indicator comprises an annunciation providing an indication that the at least one received electronic message has not yet been displayed in the message listing.

7. The handheld electronic device of claim 6, wherein the annunciation comprises at least one selected from the group comprising:
flashing, bolding, changing the size, and changing the color of the first non-numerical indicator.

8. The handheld electronic device claim 6, wherein the first indicator comprises a visual display indicating the presence of the at least one electronic message remaining in an unopened state and not yet having been displayed in the message listing.

9. The handheld electronic device of claim 6, wherein the first indicator comprises an icon indicating the presence of the at least one electronic message remaining in an unopened state and not yet having been displayed in the message listing.

10. The handheld electronic device of claim 6, wherein the second indicator comprises a visual indication of a count of unopened electronic messages.

11. A system for managing electronic messages received, comprising:
a display;
a message list displaying at least one electronic message received with identification of electronic messages that are in an unopened state;
input means for selectively displaying the message list on the display, the message list displaying summary information of electronic messages received, wherein content from a body of the at least one electronic messages is not displayed in the message list such that the at least one electronic message remains in an unopened state; and
indicator means on the display for providing a first non-numerical indicator reflecting the presence of electronic messages in the unopened state that have been received since the message list was last displayed, and a second indicator reflecting the presence of electronic messages in the unopened state following display of the message list.

* * * * *